US012393192B2

United States Patent
Goyal et al.

(10) Patent No.: US 12,393,192 B2
(45) Date of Patent: Aug. 19, 2025

(54) BEHAVIOR PREDICTION FOR RAILWAY AGENTS FOR AUTONOMOUS DRIVING SYSTEM

(71) Applicant: Waymo LLC, Mountain View, CA (US)

(72) Inventors: Vishu Goyal, Sunnyvale, CA (US); Stéphane Ross, San Jose, CA (US); Kai Ding, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 120 days.

(21) Appl. No.: 18/494,997

(22) Filed: Oct. 26, 2023

(65) Prior Publication Data
US 2024/0126296 A1   Apr. 18, 2024

Related U.S. Application Data

(63) Continuation of application No. 17/089,046, filed on Nov. 4, 2020, now Pat. No. 11,841,704.

(51) Int. Cl.
*G05D 1/02* (2020.01)
*G05D 1/00* (2006.01)
(Continued)

(52) U.S. Cl.
CPC ......... *G05D 1/0088* (2013.01); *G05D 1/0214* (2013.01); *G05D 1/228* (2024.01); *G05D 1/617* (2024.01)

(58) Field of Classification Search
CPC ..... B60W 2554/402; B60W 30/18159; B60W 60/00274; G01C 21/3415; G05D 1/0088;
(Continued)

(56) References Cited

U.S. PATENT DOCUMENTS 10,235,882 B1   3/2019   Aoude et al.
2016/0161271 A1   6/2016   Okumura
(Continued)

FOREIGN PATENT DOCUMENTS

CN   106774318 A   5/2017
CN   109562760 A   4/2019
(Continued)

OTHER PUBLICATIONS

Notice of Allowance for Chinese Patent Application No. 202111299144. 8, Apr. 23, 2024, 8 Pages.
(Continued)

*Primary Examiner* — Matthew J. Reda
(74) *Attorney, Agent, or Firm* — Botos Churchill IP Law

(57) ABSTRACT

To operate an autonomous vehicle, a rail agent is detected in a vicinity of the autonomous vehicle using a detection system. One or more tracks are determined on which the detected rail agent is possibly traveling, and possible paths for the rail agent are predicted based on the determined one or more tracks. One or more motion paths are determined for one or more probable paths from the possible paths, and a likelihood for each of the one or more probable paths is determined based on each motion plan. A path for the autonomous vehicle is then determined based on a most probable path associated with a highest likelihood for the rail agent, and the autonomous vehicle is operated using the determined path.

20 Claims, 10 Drawing Sheets

(51) Int. Cl.
*G05D 1/228* (2024.01)
*G05D 1/617* (2024.01)

(58) Field of Classification Search
CPC ......... G05D 1/0214; G05D 2201/0213; G05D 1/228; G05D 1/617; G08G 1/166; G08G 7/02
See application file for complete search history.

(56) References Cited

U.S. PATENT DOCUMENTS

| | | | |
|---|---|---|---|
| 2018/0018888 A1* | 1/2018 | Townsend | G08G 7/02 |
| 2019/0049970 A1 | 2/2019 | Djuric et al. | |
| 2019/0056238 A1 | 2/2019 | Schilling et al. | |
| 2019/0122037 A1 | 4/2019 | Russell et al. | |
| 2019/0220015 A1 | 7/2019 | Phillips et al. | |
| 2019/0265709 A1* | 8/2019 | Saikyo | B60W 30/16 |
| 2019/0287402 A1 | 9/2019 | Aoude et al. | |
| 2020/0192365 A1 | 6/2020 | Russell et al. | |
| 2020/0209862 A1 | 7/2020 | Zhou et al. | |
| 2020/0249687 A1 | 8/2020 | Russell et al. | |
| 2020/0298891 A1* | 9/2020 | Liang | G06N 5/04 |
| 2020/0371520 A1 | 11/2020 | Ren et al. | |
| 2021/0041894 A1 | 2/2021 | Urano et al. | |
| 2021/0065551 A1 | 3/2021 | Manohar et al. | |
| 2023/0415732 A1 | 12/2023 | Fairfield et al. | |

FOREIGN PATENT DOCUMENTS

| | | |
|---|---|---|
| CN | 110222885 A | 9/2019 |
| CN | 111213100 A | 5/2020 |

OTHER PUBLICATIONS

Wang, "Sharing of Vehicle Resources in Building of Urban Rail Transit Network", Shanghai Shentong Rail Transit Research and Consultancy Co., Ltd., China, 2007, 10 Pages.

The Extended European Search Report for European Patent Application No. 21205722.8, Mar. 31, 2022.

\* cited by examiner

BEHAVIOR PREDICTION FOR RAILWAY AGENTS FOR AUTONOMOUS DRIVING SYSTEM

CROSS REFERENCE TO RELATED APPLICATIONS

The present application is a continuation of U.S. patent application Ser. No. 17/089,046, filed Nov. 4, 2020, the entire disclosure of which is incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). These characteristics can be used to predict trajectories of other objects. These trajectories may define what an object is likely to do for some brief period into the future. These trajectories can then be used to control the vehicle in order to avoid these objects. Thus, detection, identification, and prediction are critical functions for the safe operation of autonomous vehicle.

BRIEF SUMMARY

Aspects of the disclosure provide for a control system for an autonomous vehicle. The control system includes a self-driving system and one or more computing devices in communication with the self-driving system. The one or more computing devices are configured to detect, using a detection system, a rail agent in a vicinity of the autonomous vehicle; determine one or more tracks on which the detected rail agent is possibly traveling; predict possible paths for the rail agent based on the determined one or more tracks; determine one or more motion plans for one or more probable paths from the possible paths; determine a likelihood for each of the one or more probable paths based on each motion plan of the one or more motion plans; and determine a path for the autonomous vehicle based on a most probable path associated with a highest likelihood for the rail agent.

In one example, the one or more computing devices are configured to determine the one or more tracks on which the detected rail agent is possibly traveling based on a type of rail agent the detected rail agent is and a location of a track in relation to a location of the rail agent. In another example, the one or more computing devices are configured to predict possible paths for the rail agent using a spatial search to identify all rail tracks in vicinity of the rail agent. In a further example, the one or more computing devices are configured to predict the possible paths for the rail agent further based on connecting tracks to the determined one or more tracks. In this example, the one or more computing devices are optionally configured to predict the possible paths for the rail agent further based on geometry of the determined one or more tracks and the connecting tracks.

In yet another example, the one or more computing devices are further configured to filter the possible paths based on characteristics of the rail agent or one or more traffic control factors, the filtered possible paths being the one or more probable paths. In this example, the characteristics of the rail agent optionally include positions of bogies or boxes relative to a given point of separate on a track along a possible path. Alternatively in this example, the one or more traffic control factors optionally include a geometry of a track along a possible path. In a still further example, each of the one or more motion plans includes predicted speeds of the rail agent. In another example, the one or more computing devices are further configured to operate, using the self-driving system, the autonomous vehicle based on the determined path.

Other aspects of the disclosure provide for a method for operating an autonomous vehicle. The method includes detecting, by one or more computing devices using a detection system, a rail agent in a vicinity of the autonomous vehicle; determining, by the one or more computing devices, one or more tracks on which the detected rail agent is possibly traveling; predicting, by the one or more computing devices, possible paths for the rail agent based on the determined one or more tracks; determining, by the one or more computing devices, one or more motion plans for one or more probable paths from the possible paths; determining, by the one or more computing devices, a likelihood for each of the one or more probable paths based on each motion plan of the one or more motion plans; determining, by the one or more computing devices, a path for the autonomous vehicle based on a most probable path associated with a highest likelihood for the rail agent; and operating, by the one or more computing devices, the autonomous vehicle based on the determined path.

In one example, the determining of the one or more tracks on which the detected rail agent is possibly traveling includes determining a type of rail agent the detected rail agent is and a location of a track in relation to a location of the rail agent. In another example, the predicting of possible paths for the rail agent using a spatial search to identify all rail tracks in vicinity of the rail agent. In a further example, the predicting of the possible paths for the rail agent includes identifying connecting tracks to the determined one or more tracks. In this example, the predicting of the possible paths for the rail agent further optionally includes determining geometry of the determined one or more tracks and the connecting tracks.

In yet another example, the method also includes filtering the possible paths based on characteristics of the rail agent or one or more traffic control factors, the filtered possible paths being the one or more probable paths. In this example, the characteristics of the rail agent optionally include positions of bogies or boxes relative to a given point of separate on a track along a possible path. Alternatively in this example, the one or more traffic control factors optionally include a geometry of a track along a possible path. In a still further example, each of the one or more motion plans includes predicted speeds of the rail agent.

Further aspects of the disclosure provide for a non-transitory, tangible computer-readable storage medium on which computer readable instructions of a program are stored. The instructions, when executed by one or more processors, cause the one or more processors to perform a method. The method includes detecting, using a detection system, a rail agent in a vicinity of an autonomous vehicle;

determining one or more tracks on which the detected rail agent is possibly traveling; predicting possible paths for the rail agent based on the determined one or more tracks; determining one or more motion plans for one or more probable paths from the possible paths; determining a likelihood for each of the one or more probable paths based on each motion plan of the one or more motion plans; determining a path for the autonomous vehicle based on a most probable path associated with a highest likelihood for the rail agent; and operating the autonomous vehicle based on the determined path.

DETAILED DESCRIPTION

Overview

The technology relates to prediction of rail agent behavior for informing a driving behavior of an autonomous vehicle. Rail agents behave differently than other road agents because rail agents are constrained to a rail or other type of track. Sometimes rail agents also have stop signs and traffic lights that apply to the rail agents but not other road agents. Rail agents also may have different characteristics, such as speed, size, turning behavior, or other types of behaviors. In addition, rail agents may have higher precedence over other road agents and therefore react differently than other road agents to a certain situation. In addition, the autonomous vehicle may have to react differently to a rail agent versus a road agent. Having a more accurate method of predicting rail agent behavior can improve how an autonomous vehicle drives in the presence of a rail agent.

The technology herein may allow for an autonomous vehicle to navigate safely and effectively in a presence of a rail agent, including actions such as stopping, yielding, or nudging forward. By taking into account track information and differences in the behavior of a rail agent from other agents, a more accurate model of the rail agent behavior may be created. The more accurate model of rail agent behavior may then allow for better path planning by the autonomous vehicle. The ride in the autonomous vehicle may therefore require fewer updates and may be smoother for the passenger. Additionally, resources for the systems of the autonomous vehicle may be budgeted more efficiently as a result, which may increase longevity of the systems.

EXAMPLE SYSTEMS

Figure 1:
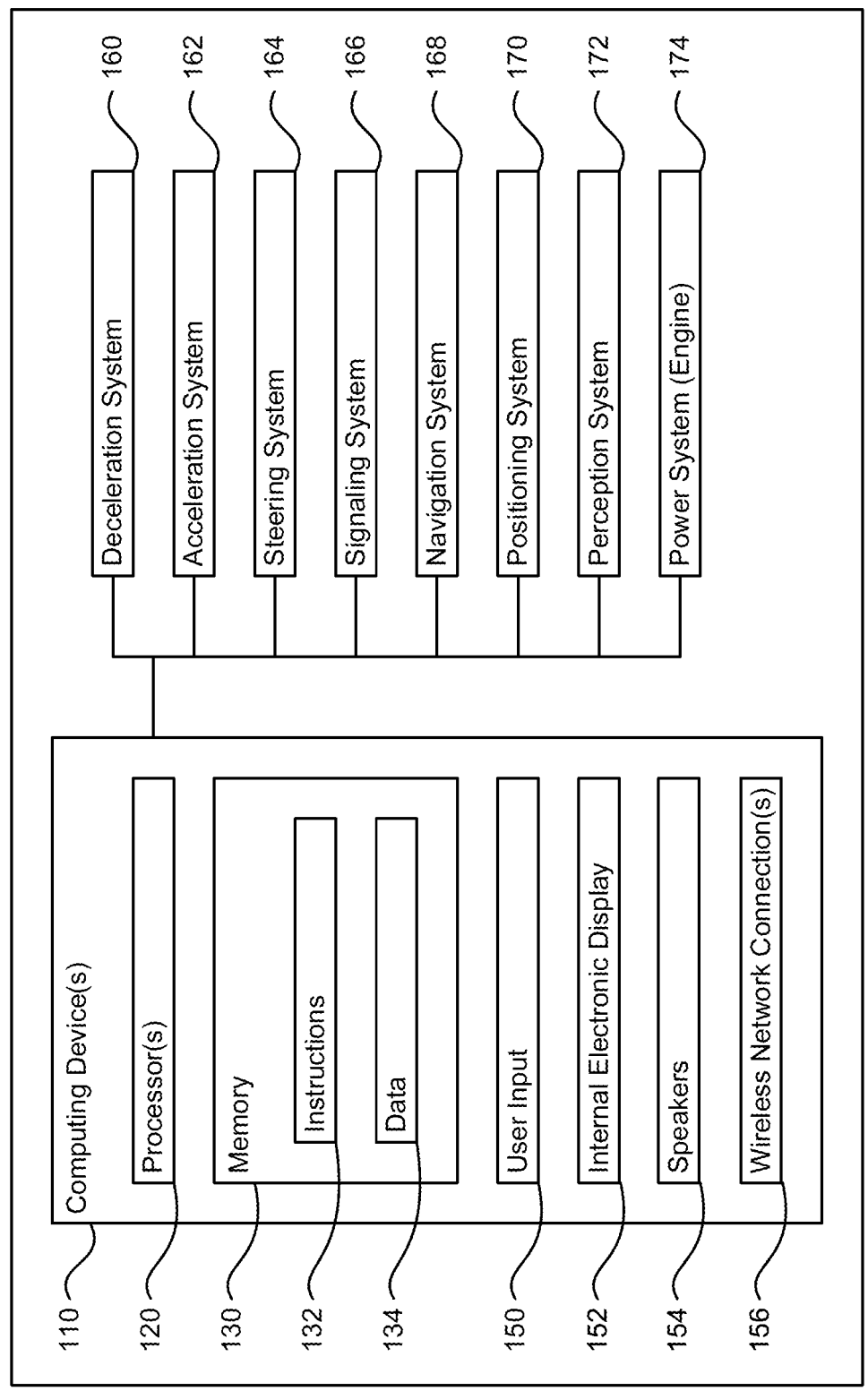
FIG. 1 is a functional diagram of an example vehicle in accordance with aspects of the disclosure.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 30 to 60 degrees offset from a current path of the vehicle." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own CPU or other processor, memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. In addition to internal speakers, the one or more speakers 154 may include external speakers that are arranged at various locations on the vehicle in order to provide audible notifications to objects external to the vehicle 100. The computing device 110 of vehicle 100 may also receive or transfer information to and from other computing devices, for instance using wireless network connections 156.

In one example, computing device 110 may be an autonomous driving computing system incorporated into vehicle 100. The autonomous driving computing system may be capable of communicating with various components of the vehicle. For example, computing device 110 may be in communication with various self-driving systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The computing device 110 may control the direction and speed of the vehicle by controlling various components. By way of example, computing device 110 may navigate the vehicle to a destination location completely autonomously using data from the map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing device 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store map information, e.g., highly detailed maps that computing device 110 can use to navigate or control the vehicle. As an example, these maps may identify the shape and elevation of roadways, lane markers, intersections, crosswalks, speed limits, traffic signal lights, buildings, signs, real time or historical traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line. As noted above, the map information may store known traffic or congestion information and/or transit schedules (train, bus, etc.) from a particular pickup location at similar times in the past. This information may even be updated in real time by information received by the computing device 110.

Figure 2:
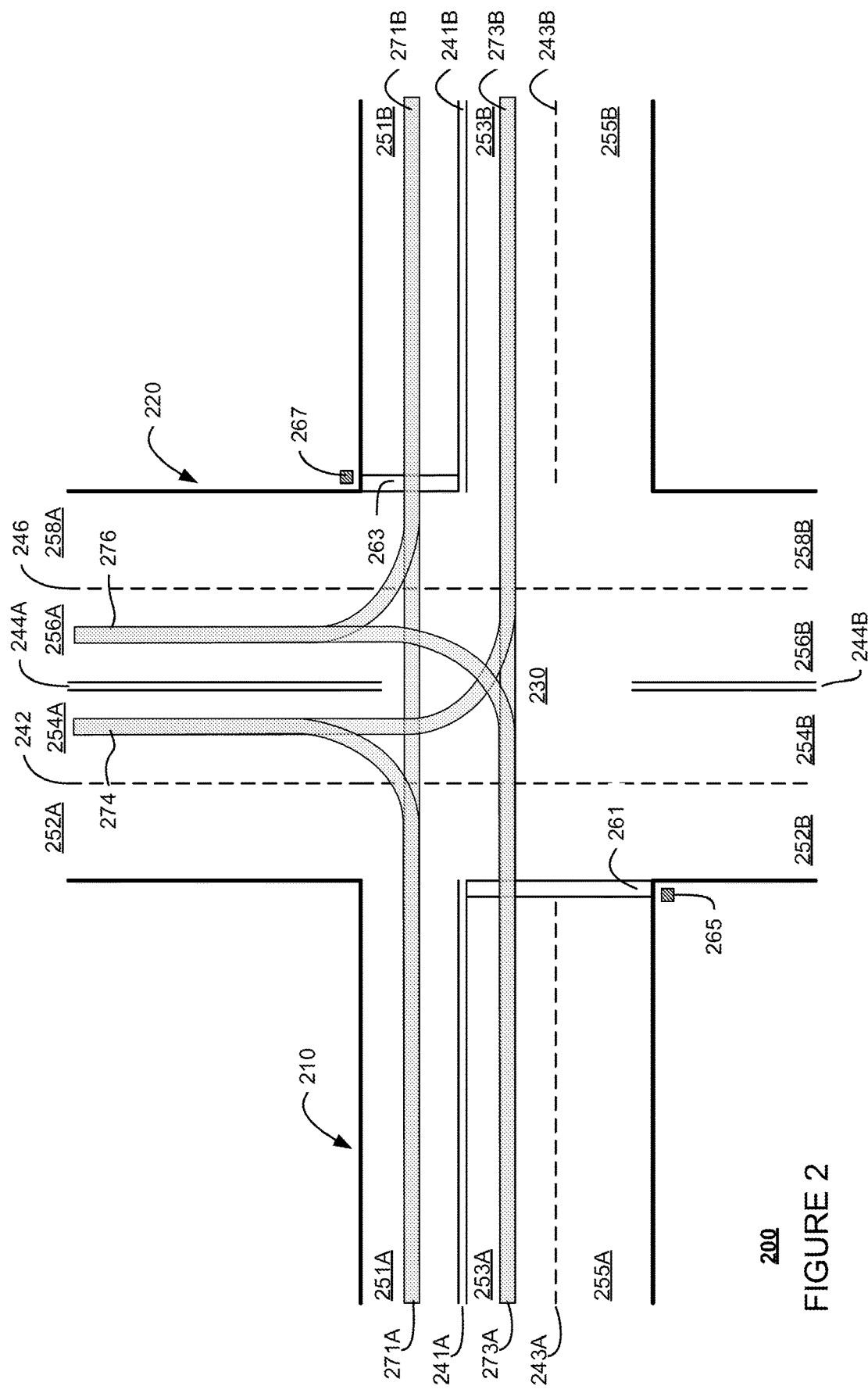
FIG. 2 is an example map information in accordance with aspects of the disclosure.

FIG. 2 is an example of map information 200 for a section of roadway including intersection 230. In this example, map information 200 depicts a portion of the map information that includes information identifying the shape, location, and other characteristics of various features. For example, map information 200 includes road 210 and road 220 intersecting at intersection 230. Map information 200 includes lane markers or lane lines 241A and 243A of road 210 on a first side of intersection 230, lane lines 241B and 243B of road 210 on a second side of intersection 230 opposite the first side. In addition, map information includes lane lines 242 and 246 of road 220 passing through intersection 230 from a third side to a fourth side opposite the third side, lane line 244A of road 220 on the third side of intersection 230, and lane line 244B of road 220 on the fourth side of intersection 230. The lane lines may be different types of lane lines, such as double lane lines 241A, 241B, 244A, and 244B, and broken lane lines 242, 243A, 243B, and 246. The lane lines may also define various lanes, such as lanes 251, 252, 253, 254, 255, 256, and 258.

Lane portions 251A, 253A, and 255A of road 210 are on a first side of intersection 230, and lane portions 251B, 253B, and 255B of road 210 are on a second side of intersection 230 opposite the first side. Lane portions 252A, 254A, 256A, and 258A of road 220 are on a third side of intersection 230, and lane portions 252B, 254B, 256B, and 258B of road 220 are on a fourth side of intersection 230 opposite the third side. The lanes may be explicitly identified in the map information 200 as shown, or may be implied by the width of a road. Map information 200 may also identify bicycle lanes. As shown, map information 200 may also include stop lines 261 and 263 for road 210. Stop line 261 may be associated with a stop sign 265, and stop line 263 may be associated with a stop sign 267.

The map information 200 includes rail tracks 271, 273, 274, and 276 crossing the intersection 230. Rail track portion 271A is in lane portion 251A; rail track portion 271B is in lane portion 251B; rail track portion 273A is in lane portion 253A; rail track portion 273B is in lane portion 253B; rail track portion 274 is in lane portion 254A, and rail track portion 276 is in lane portion 256A. Rail track portion 271B connects with rail track portion 276 (right turn) and rail track portion 271A (straight); rail track portion 273A connects with rail track portion 276 (left turn) and rail track portion 273B (straight); and rail track portion 274 connects with rail track portion 271A (right turn) and rail track portion 273B (left turn).

In addition to these features, the map information 200 may also include information that identifies the direction of traffic and speed limits for each lane as well as information that allows the computing device 110 to determine whether the vehicle has the right of way to complete a particular maneuver (e.g., to complete a turn or cross a lane of traffic or intersection). Map information 200 may further include information on traffic signs, such as traffic lights, stop signs, one-way sign, no-turn sign, etc. Map information 200 may include information about other environmental features such as curbs, buildings, parking lots, driveways, waterways, vegetation, etc.

Although the detailed map information is depicted herein as an image-based map, the map information need not be entirely image based (for example, raster). For example, the detailed map information may include one or more road-graph or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing device 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent for further processing to the computing device 110 periodically or continuously as it is generated by the perception system 172. As discussed in further detail below, computing device 110 may use the positioning system 170 to determine the vehicle's location and perception system 172 to detect and respond to objects when needed to reach the location safely.

Figure 3:
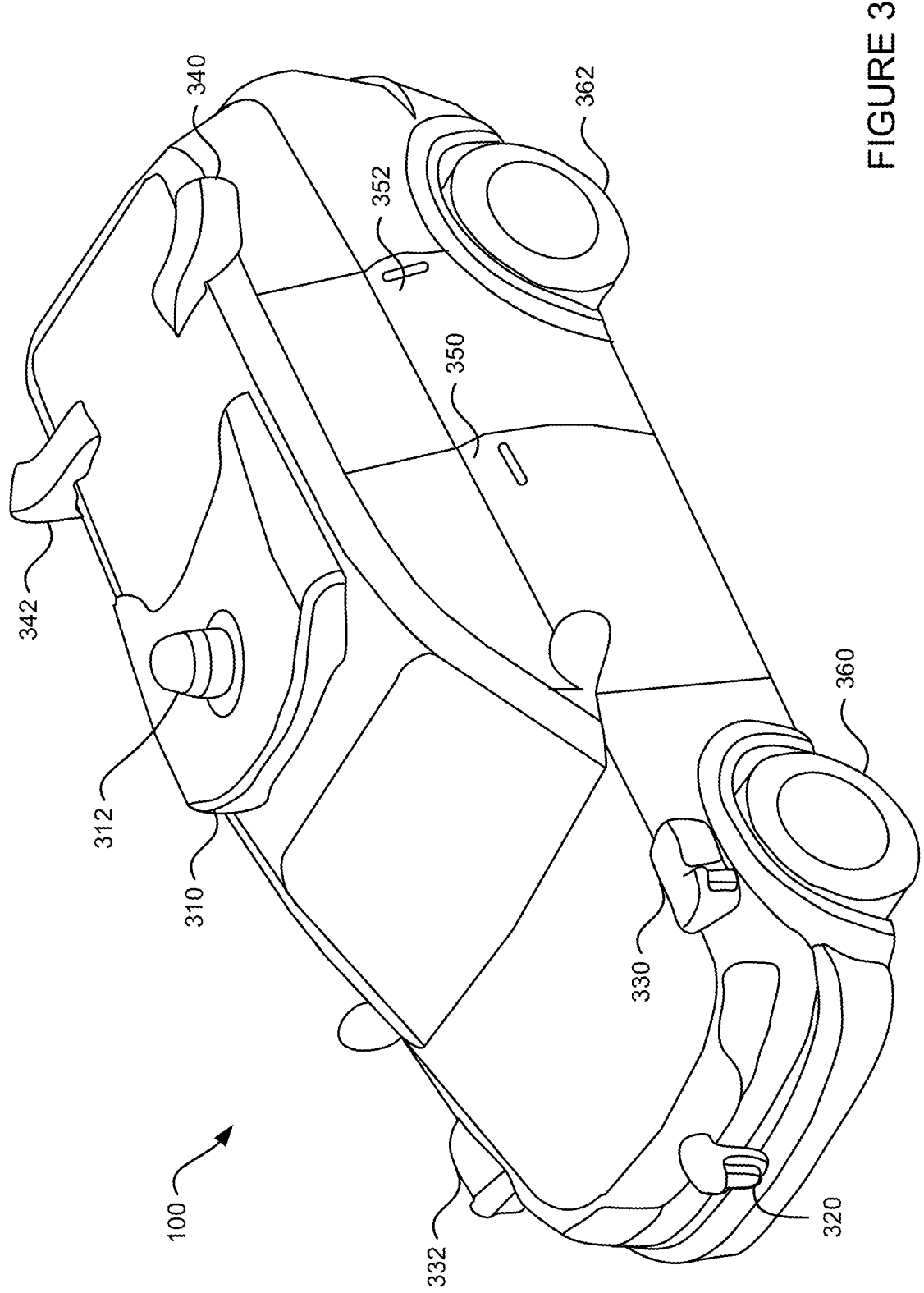
FIG. 3 is an example external view of a vehicle in accordance with aspects of the disclosure.

FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

Once a nearby object is detected, computing device 110 and/or perception system 172 may determine the object's type, for example, a traffic cone, pedestrian, a vehicle (such as a passenger car, truck, bus, etc.), bicycle, etc. Objects may be identified by various models which may consider various characteristics of the detected objects, such as the size of an object, the speed of the object (bicycles do not tend to go faster than 40 miles per hour or slower than 0.1 miles per hour), the heat coming from the bicycle (bicycles tend to have rider that emit heat from their bodies), etc. In addition, the object may be classified based on specific attributes of the object, such as information contained on a license plate, bumper sticker, or logos that appear on the vehicle.

Memory 130 may store various models used by computing device 110 to make determinations on how to control vehicle 100. For example, memory 130 may store one or more object recognition models for identifying road users and objects detected from sensor data. For another example, memory 130 may store one or more behavior models for providing the probability of one or more actions being taken a detected object. For another example, memory 130 may store one or more speed planning models for determining speed profiles for vehicle 100 based on map information 200 from navigation system 168 and predicted trajectories of other road users detected by sensor data from perception system 172.

Figure 4:
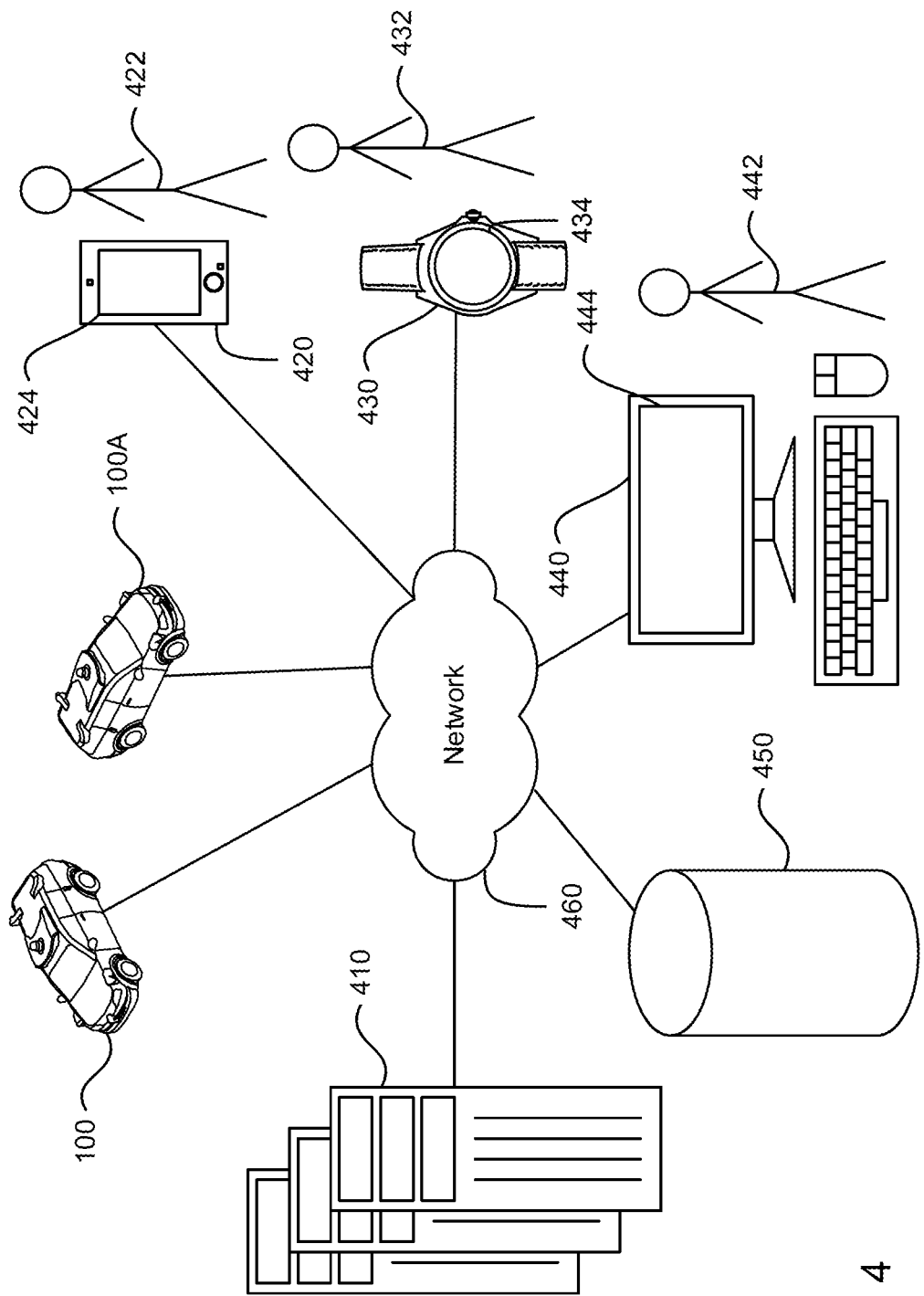
FIG. 4 is an example pictorial diagram of a system in accordance with aspects of the disclosure.
Figure 5:
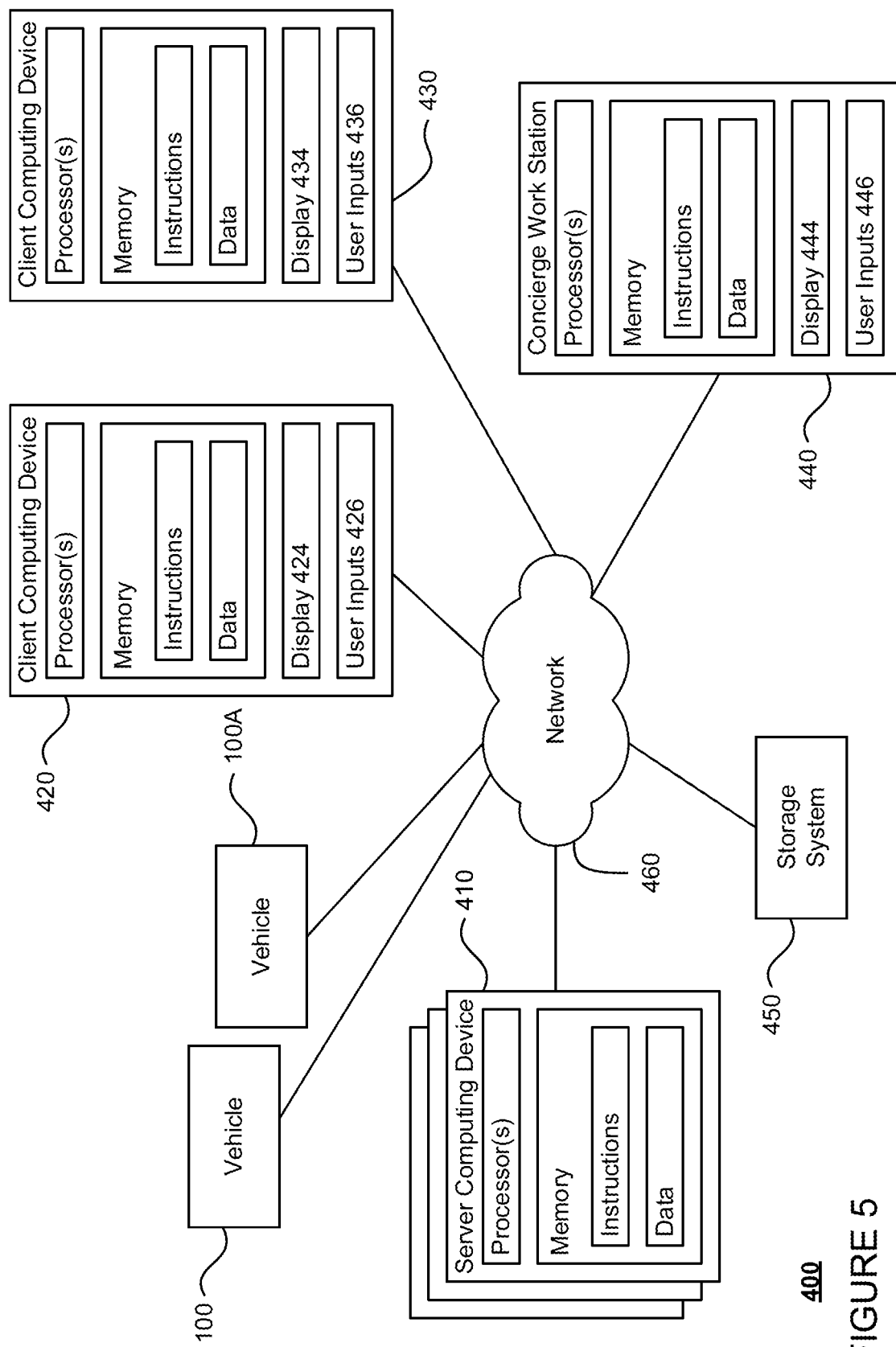
FIG. 5 is an example functional diagram of a system in accordance with aspects of the disclosure.

FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as BLUETOOTH®, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 110 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with the computing device 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a CPU), memory (e.g., RAM and internal hard drives) storing data and instructions, a display such as displays 424, 434, 444 (e.g., a monitor having a screen, a touchscreen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wrist watch in FIG. 4. As an example the user may input information using a small keyboard, a keypad, microphone, using visual signals with a camera, or a touch screen.

In some examples, client computing device 440 may be remote operator work station used by an administrator to provide remote operator services to users such as users 422 and 432. For example, a remote operator 442 may use the remote operator work station 440 to communicate via a telephone call or audio connection with users through their respective client computing devices and/or vehicles 100 or 100A in order to ensure the safe operation of vehicles 100 and 100A and the safety of the users as described in further detail below. Although only a single remote operator work station 440 is shown in FIGS. 4 and 5, any number of such work stations may be included in a typical system.

Storage system 450 may store various types of information as described in more detail below. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The storage system 450 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc. The storage system 450 may further store map information, such as map information 200.

The storage system 450 may also store various models for routing and controlling vehicle 100, such as object recognition models, behavior models, speed planning models, etc. In this regard, the storage system 450 may store data used for training some or all of these models. For example, training data may include images manually labeled with identified objects, videos of trajectories taken by road users in various traffic patterns. The storage system 450 may store other data required for using these models, such as parameters and values.

The storage system 450 may also store information which can be provided to client computing devices for display to a user. For instance, the storage system 450 may store predetermined distance information for determining an area at which a vehicle is likely to stop for a given pickup or destination location. The storage system 450 may also store graphics, icons, and other items which may be displayed to a user as discussed below.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

EXAMPLE METHODS

Figure 6:
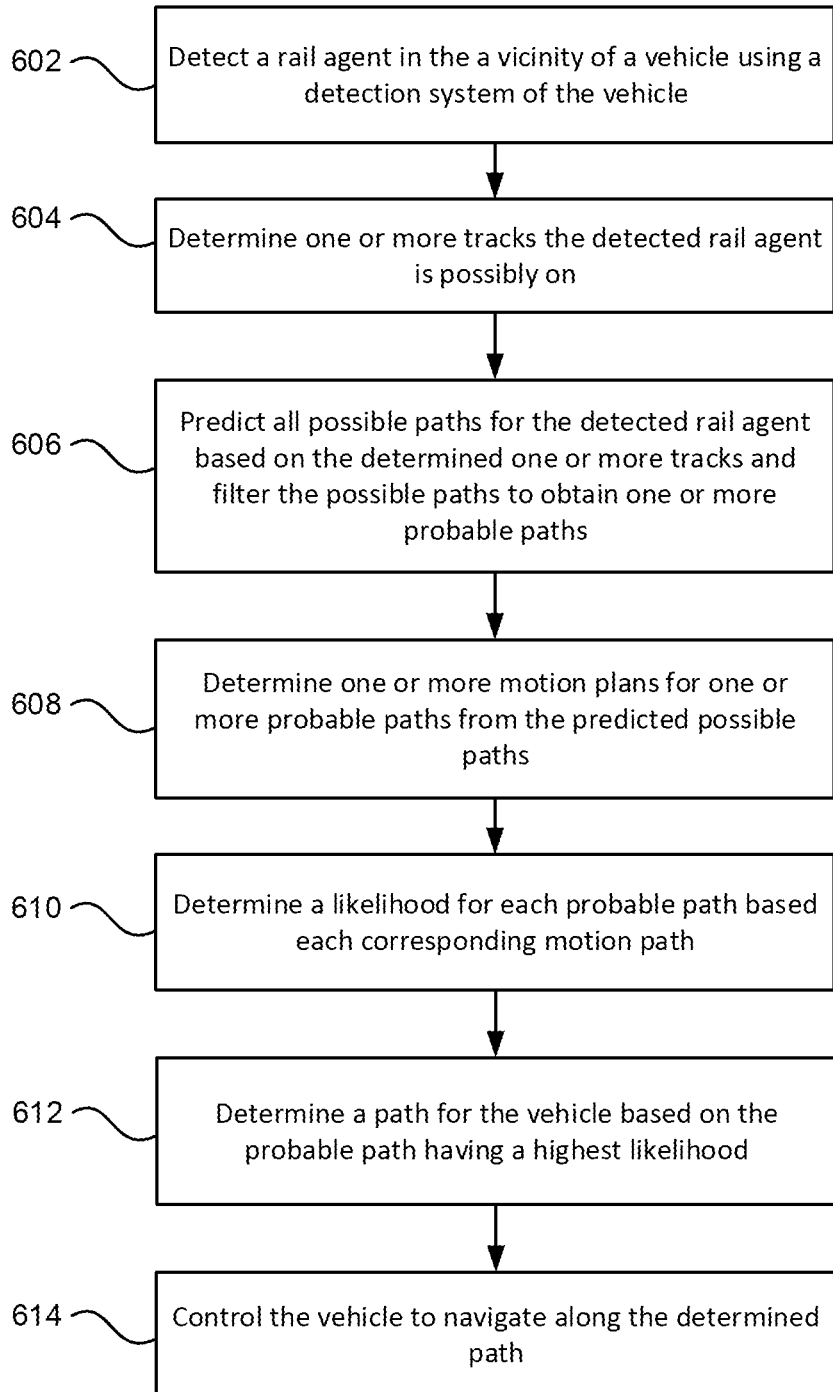
FIG. 6 is a flow diagram 600 of a method for operating a vehicle in accordance with aspects of the disclosure.

In addition to the systems described above and illustrated in the figures, various operations will now be described. The computing device 110 may predict a behavior of a rail agent in a vehicle's environment using track characteristics in the vehicle's environment as described below. In FIG. 6, flow diagram 600 is shown in accordance with aspects of the disclosure that may be performed by the computing device 110. While FIG. 6 shows blocks in a particular order, the order may be varied and that multiple operations may be performed simultaneously. Also, operations may be added or omitted.

At block 602, the vehicle's computing devices 110 may detect a rail agent in a vicinity of the vehicle 100 using the perception system 172. The vicinity of the vehicle 100 may be defined by ranges of the sensors and other detection systems of the perception system 172 of the vehicle 100. Sensor data obtained from the perception system 172 may include object data defining a rail agent. The vehicle's computing devices 110 may identify the rail agent using the object data along with the characteristics of the rail agent. For example, the rail agent may be detected having a given pose, orientation, dimensions, speed, direction, number of bogies or boxes, number of sections or cars, or other characteristics. The rail agent may be determined as a particular type of rail agent based on the detected characteristics, such as a train, a light rail vehicle, tram or streetcar, or a cable car or trolley.

In addition to detecting the rail agent, the vehicle's computing devices 110 may also detect a plurality of objects in the vehicle's vicinity. For instance, sensor data from the perception system 172 may also include characteristics of each object, such as the object's size, shape, speed, orientation, direction, etc. The plurality of objects may include moving and/or stationary objects. In particular, the plurality of objects may include other road users, such as vehicles, bicycles, or pedestrians, may include other types of obstructions, such as buildings, posts, trees, or construction tools, or may include traffic features, such as lights, signs, lane lines, curbs, or rail tracks.

Figure 7:
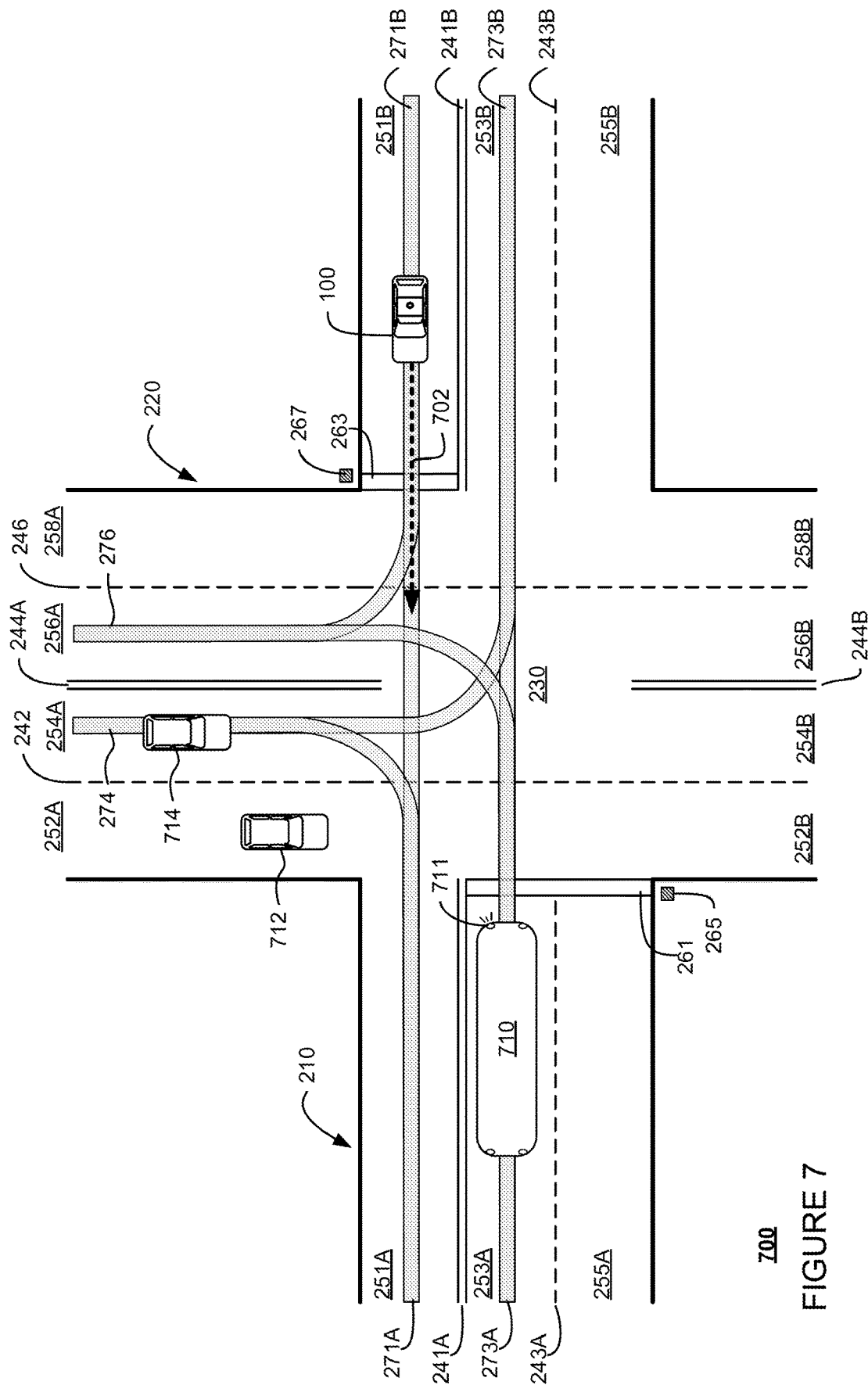
FIG. 7 is an example pictorial diagram of a scenario 700 in accordance with aspects of the disclosure.

In scenario 700 depicted in FIG. 7, the vehicle 100 may be in lane portion 251B of road 210 by intersection 230, approaching at stop line 263. The vehicle 100 may have a planned maneuver 702 to go straight through the intersection 230. The planned maneuver 702 of the vehicle, illustrated as a dotted line, includes travelling straight along lane portion 251B into lane portion 251A on the other side of the intersection 230. In the maneuver 702, the vehicle 100 has to cross lanes 258, 256, 254, and 252 of the road 220. From the position of the vehicle 100, the vehicle's computing devices 110 may use the perception system 172 to detect rail agent 710, vehicles 712, 714, lane lines 241A, 241B, 243A, 243B, 242, 244A, 244B, 246, stop lines 261, 263, stop signs 265, 267, rail tracks 271, 273, 274, and 276, and characteristics of the detected objects and features. Characteristics of the detected objects and features may include type of lane lines, geometry of lane lines and rail tracks, location and pose of vehicles (vehicle 712 in lane portion 252A and vehicle 714 in lane portion 254A), trajectory of vehicles (towards intersection 230), shape of signs (octagon), and location and orientation of signs. The characteristics of the rail agent 710 may include length (50 feet), width (8.5 feet), height (10 feet), surface shape (rounded rectangular prism), number of cars (1), number of bogies (2), location (in lane portion 273A proximate to stop line 261), and direction of travel (towards intersection 230 from lane portion 273A). The vehicle's computing devices 110 may also detect a blinking light on the rail agent 710, particularly the left turn blinker 711. The rail agent 710 may further be determined as a light rail vehicle based on the detected characteristics.

At block 604, the vehicle's computing devices 110 may determine which track or tracks the detected rail agent is possibly on. The track determination may be made based on the given pose of the rail agent and the physical characteristics of the rail agent. In some examples, the vehicle's computing devices 110 may determine a type of rail agent based on the detected physical characteristics and determine a possible number of tracks associated with the determined type of rail agent. The possible number of tracks may be based on detected tracks in the vicinity of the vehicle and/or map information of the roadways near the vehicle's location that is accessible by the vehicle's computing devices 110. The given pose may then be used to determine which of the possible number of tracks the rail agent is on based on which tracks are located where the rail agent is and also allow for travel in a given direction corresponding to the given pose. In some implementations, when there is a plurality of tracks for the type of rail agent in the vicinity of the rail agent, there may be more than one track that the detected rail agent is possibly on.

In the scenario shown in FIG. 7, the vehicle's computing devices 110 may determine that the rail agent 710 is on track portion 273A based on the location of the rail agent in lane portion 253A, where the track portion 273A is also located. The location of the track portion 273A may be determined based on the detected objects and features and/or based on stored map information 200. In addition, because the rail agent 710 is determined as a light rail vehicle based on the detected characteristics, the track portion 273A may also be determined to be a track for a light rail vehicle.

At block 606, the vehicle's computing devices 110 may predict all possible paths for the rail agent based on the determined track or tracks. The prediction may be performed using a spatial search to identify all rail tracks in vicinity of the rail agent and to determine possible paths connected to the determined track. The determination may take into account traffic control features related to the track, such as lane of travel, geometry of the tracks, track connections, track intersections, signs or light signals directing traffic on the track, etc. The prediction may include all possible transfers or turns, which can include any possible turn up to 180 degrees, or a U-turn. The prediction may also be performed using pre-stored map information that includes rail tracks in the vicinity of the autonomous vehicle.

Figure 8:
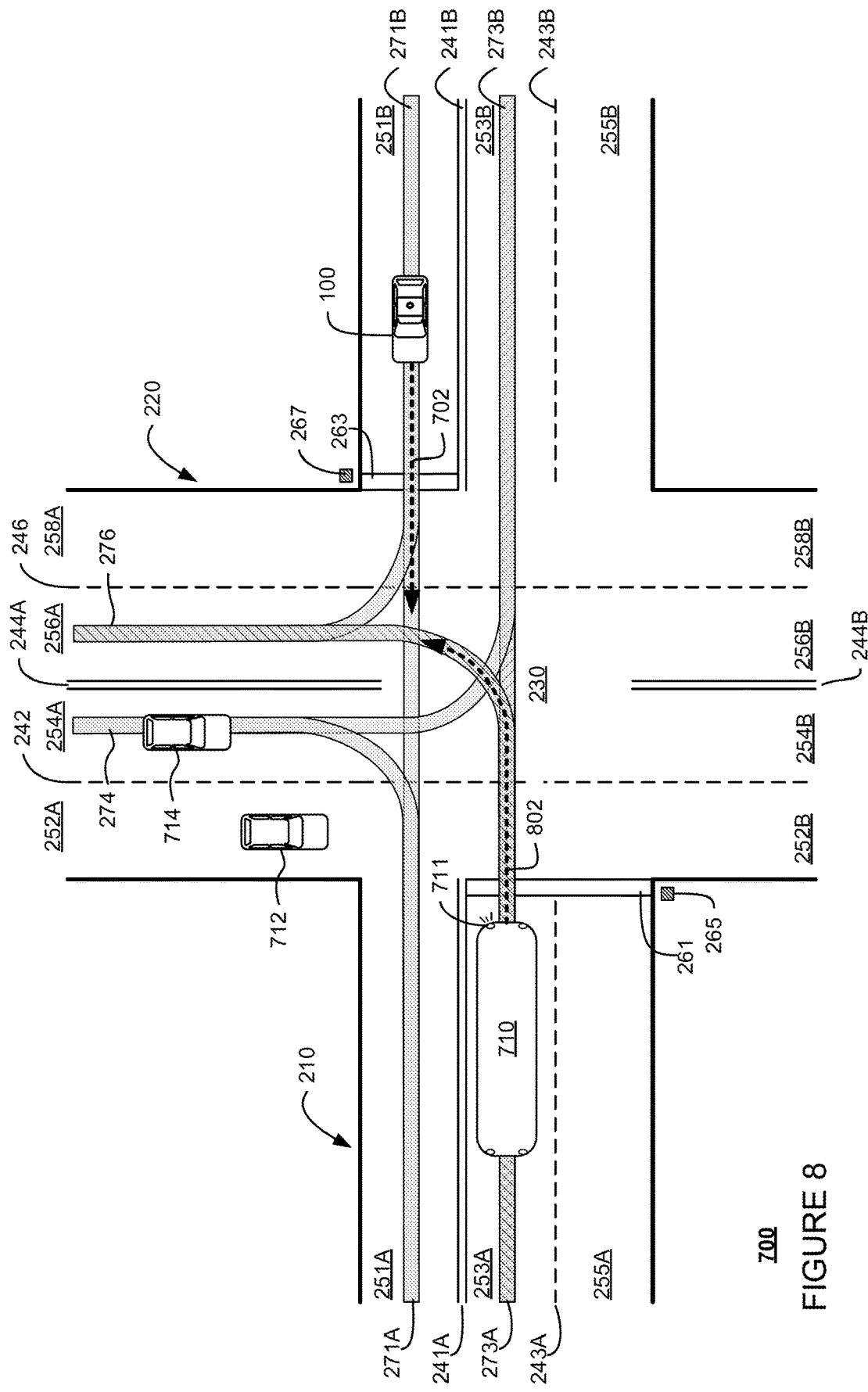
FIG. 8 is a further example pictorial diagram of the scenario 700 in accordance with aspects of the disclosure.

In the scenario 700, the vehicle's computing devices 110 may predict the possible paths for the rail agent 710 includes a left turn onto track portion 276 or a straight onto track portion 273B based on the connections of the track portion 276 and track portion 273B to track portion 273A. As shown in FIG. 8, the predicted possible paths are marked with stripes. Track portion 274 may not be included in the predicted possible paths because the direction of traffic on lane portion 254A and track portion 274 is in the opposite direction of the rail agent. In addition, the connection of track portion 274 to track portion 273 has a geometry that is unusable by the rail agent 710. Track portion 271A may also not be included in the predicted possible paths because the geometry of the connections between track portion 271A and track portion 273A is similarly unusable by the rail agent 710.

The possible paths may be further filtered by the vehicle's computing devices 110 based on the characteristics of the rail agent or one or more traffic control factors. The filtering may result in a plurality of probable paths for the rail agent. The characteristics may include orientation, lights on the rail agent that may signal a planned trajectory or braking, signs on the rail agent, or positions of bogies or boxes relative to a given point of separation in the track. When a bogie of the rail agent has already passed the given point of separation in the track, any path including a turn at the given point may be filtered out from the possible paths. The traffic control factors may include road signs, such as "left turn only, "right turn only," or "no turns" signs, or previously detected behavior of the rail agent relative to other agents. In the scenario 700, the computing device 110 may filter the straight path onto track portion 273B based on the detected light from the left blinker 711 of the rail agent 710. As a result, the probable path for the rail agent 710 may be determined as the left turn onto track portion 276, as indicated by dotted arrow 802 in FIG. 8.

At block 608, the vehicle's computing devices 110 may determine one or more motion plans for each probable path from the possible paths. Each motion plan may include predictions for speed, acceleration/deceleration, lengths of stops, or position of cars in the rail agent. In some implementations, the motion of the rail agent may be characterized by a set of lane segments, where each lane segment represents a distance traveled by the rail agent in a given time interval. To determine the motion of the rail agent, the motion path planning may factor in characteristics of the rail agent, such as pose, dimensions, speed, number of bogies or boxes, number of sections or cars, or special constraints for each type of rail agent. The motion path planning may also factor in traffic signals, road signs, and behavior of other agents. For instance, the vehicle's computing devices 110 may determine the motion plan to account for how the rail agent would react to pedestrians positioned relative to a crosswalk or other type of crossing, other road agents whose paths intersect with the probable path of the rail agent, and signs positioned on along the probable path of the rail agent. When a rail agent is stationary, the motion path planning may further include whether the rail agent is temporarily stopped, such as at a red light, or parked for a more extended period of time. Special constraints for a given rail agent having more than one car may include limitations to the movement of the rail agent based on a relationship of each car to another and to one or more bogies on the rail agent.

Figure 9A:
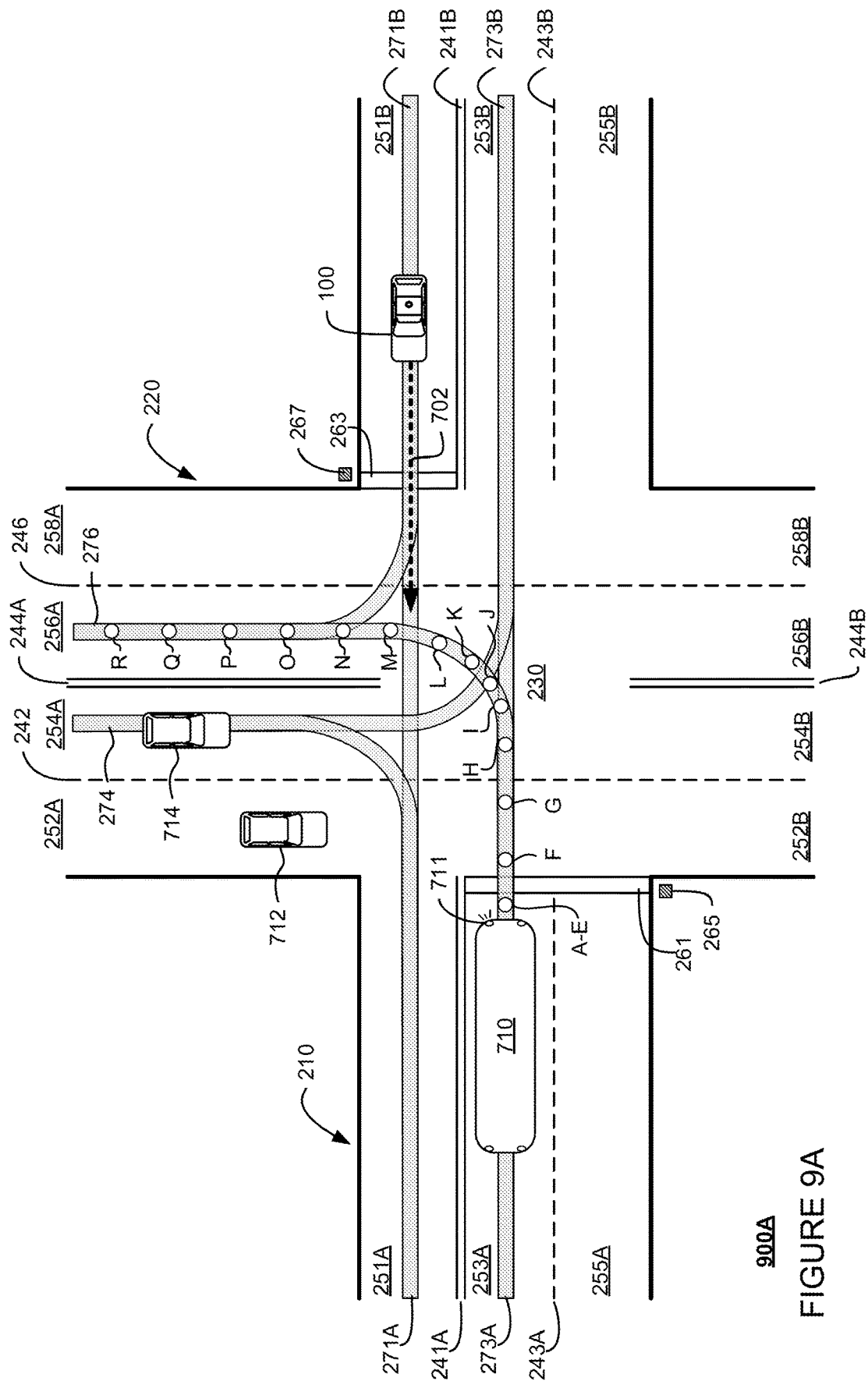
FIG. 9A is an example pictorial diagram of a predicted motion plan 900A in accordance with aspects of the disclosure.
Figure 9B:
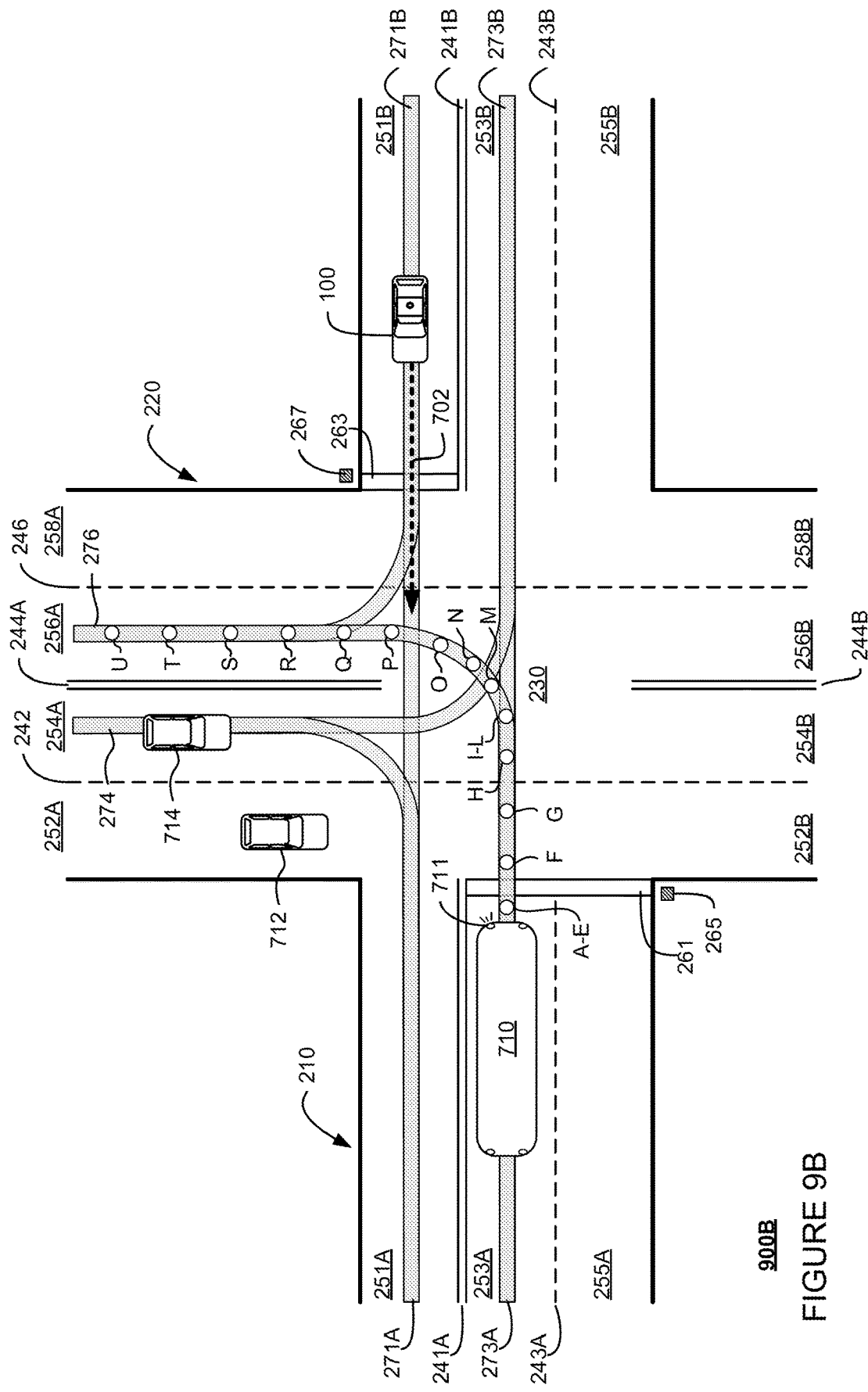
FIG. 9B is another example pictorial diagram of a predicted motion plan 900B in accordance with aspects of the disclosure.

As shown in FIGS. 9A and 9B, one or more motion plans represented by dots along the track may be determined for probable path 802 for rail agent 710. The dots represent predicted positions of the front of the rail agent 710 at regular time intervals, such as every 1 second. Overlapping dots indicate that the rail agent is stopped for a period of time. For example, as shown in FIGS. 9A and 9B, dots A, B, C, D, and E may be overlapping at the same position before the stop line 261, indicating that the rail agent 710 stops there for about 5 seconds. Dots A-E of the motion plans 900A and 900B may be determined based on determining that the stop sign 265 applies to rail agent 710 and estimating where the rail agent 710 will stop based on the location of the stop line 261. The length of time for which the rail agent 710 is stopped at the stop sign 265 may be determined based on a likely trajectory and speed of vehicles 712, 714 that have right-of-way in the intersection 230 according to traffic laws.

After the length of time, such as 5 seconds, elapses, the vehicle's computing devices 110 may predict the subsequent dots of the motion plans 900A and 900B based on one or more likely acceleration behaviors and turning behaviors of the rail agent 710. The acceleration behavior and turning behavior of the rail agent may be estimated based on detected characteristics of the rail agent, previously detected behavior of the rail agent, models of the rail agent motion, and/or known capabilities of the rail agent. As shown in FIG. 9A, from the stopped position at dots A-E, a first motion plan 900A for rail agent 710 includes accelerating for three seconds to dot H and decelerating for two seconds through dot J to make the left turn onto track portion 276. From dot J, the first motion plan for rail agent 710 includes accelerating for about four seconds through dot N and moving at about a steady speed subsequently along track portion 276. As shown in FIG. 9B, a second motion plan 900B may be determined in the possible situation where the rail agent 710 stops before making the left turn to allow traffic in lane portion 251B, including the vehicle 100, to pass. The second motion plan 900B therefore includes accelerating for three seconds to dot H and decelerating to a stop at dots I-L. The second motion plan 900B also includes making the turn from dot L through P and then subsequently moving at about a steady speed along track portion 276.

At block 610, the vehicle's computing devices 110 may determine a likelihood for each probable path based on each corresponding motion plan. A most probable path may have the highest likelihood. The likelihood may be determined based on how characteristics of the rail agent compare with known behaviors of rail agents performing maneuvers similar to maneuvers on each probable path. In some implementations, the likelihood may be determined using machine learning techniques. Between motion paths 900A and 900B, the vehicle's computing devices may determine that motion path 900A has a higher likelihood than motion path 900B because the rail agent 710 most likely reaches and enters the intersection 230 before the vehicle 100 does. As a result, the rail agent 710 is more likely to make the turn rather than wait for the vehicle 100 to cross the intersection.

At block 612, the vehicle's computing devices 110 may determine a path for the vehicle 100 based on the probable path for the rail agent having a highest likelihood. For example, the path determined for the vehicle 100 may yield to the rail agent when the path intersects with the most probable path for the rail agent. The first motion path 900A for the rail agent 710 may be used in scenario 700 because it has the highest likelihood between it and the second motion path 900B. Because the motion path 900A does not include the rail agent yielding for traffic in lane portion 251B where the vehicle 100 is, the vehicle's computing devices 110 may determine that the path for the vehicle 100 includes yielding for the rail agent 710 before passing straight through the intersection according to the planned maneuver 702. In particular, the path for the vehicle 100 may be determined to include driving about two second to reach and stop at the stop line 263, waiting at the stopped location for about 10 seconds for the vehicles 712, 714 and rail agent 710 to pass, and driving from the stopped location to cross straight through the intersection 230. Alternatively, when the second motion path 900B for the rail agent 710 is more likely, the path for the vehicle 100 may be determined to stop at the stop line for less time, such as 5 seconds, before driving from the stopped location to cross straight through the intersection 230.

At block 614, the vehicle 100 may then be controlled by the vehicle's computing devices 110 to navigate along the determined path for the vehicle. The vehicle's computing devices 110 may send instructions to one or more self-driving systems of the vehicle 100, including the deceleration system 160, acceleration system 162, and steering system 164.

The technology herein may allow for an autonomous vehicle to navigate safely and effectively in a presence of a rail agent, including actions such as stopping, yielding, or nudging forward. By taking into account track information and differences in the behavior of a rail agent from other agents, a more accurate model of the rail agent behavior may be created. The more accurate model of rail agent behavior may then allow for better path planning by the autonomous vehicle. The ride in the autonomous vehicle may therefore

The invention claimed is:

1. A system comprising one or more computing devices configured to:
   detect, using a detection system including one or more sensors, a rail agent in a vicinity of an autonomous vehicle, the rail agent being on a track having a geometry;
   determine a likelihood for each of one or more probable paths of the rail agent based on each of one or more motion plans of the one or more probable paths, wherein at least one of the one or more probable paths includes a path direction in which the rail agent will probably travel and at least one of the one or more motion plans;
   determine a path for the autonomous vehicle based on a most probable path for the rail agent; and
   operate the autonomous vehicle based, at least in part, upon the determined path.

2. The system of claim 1, wherein the most probable path has a highest likelihood.

3. The system of claim 1, wherein the at least one of the one or more motion plans includes a predicted acceleration and deceleration of the rail agent.

4. The system of claim 1, wherein the at least one of the one or more motion plans includes a predicted speed of the rail agent.

5. The system of claim 1, wherein the at least one of the one or more motion plans includes a length of a stop of the rail agent.

6. The system of claim 1, wherein the at least one of the one or more motion plans includes a position of cars in the rail agent.

7. The system of claim 1, wherein the likelihood for each of the one or more probable paths of the rail agent is determined further based on possible paths for the rail agent, and wherein the one or more computing devices are further configured to filter the possible paths based on characteristics of the rail agent or one or more traffic control factors, the filtered possible paths being the one or more probable paths.

8. The system of claim 7, wherein the characteristics of the rail agent include positions of bogies or boxes relative to a given point of separation in a track along a possible path.

9. The system of claim 7, wherein the one or more traffic control factors include the geometry of the track along a possible path.

10. A method comprising:
    detecting, by one or more computing devices using a detection system including one or more sensors, a rail agent in a vicinity of an autonomous vehicle, the rail agent being on a track having a geometry;
    determining, by the one or more computing devices, a likelihood for each of one or more probable paths of the rail agent based on each of one or more motion plans of the one or more probable paths, wherein at least one of the one or more probable paths includes a path direction in which the rail agent will probably travel and at least one of the one or more motion plans;
    determining, by the one or more computing devices, a path for the autonomous vehicle based on a most probable path for the rail agent; and
    operating, by the one or more computing devices, the autonomous vehicle based, at least in part, upon the determined path.

11. The method of claim 10, wherein the most probable path has a highest likelihood.

12. The method of claim 10, wherein the at least one of the one or more motion plans includes a predicted acceleration and deceleration of the rail agent.

13. The method of claim 10, wherein the determining of the likelihood for each of the one or more probable paths of the rail agent is further based on possible paths for the rail agent, and the method further comprises filtering the possible paths based on characteristics of the rail agent or one or more traffic control factors, the filtered possible paths being the one or more probable paths.

14. The method of claim 13, wherein the characteristics of the rail agent include positions of bogies or boxes relative to a given point of separation in a track along a possible path.

15. The method of claim 13, wherein the one or more traffic control factors include the geometry of the track along a possible path.

16. A non-transitory, tangible computer-readable storage medium on which computer readable instructions of a program are stored, the instructions, when executed by one or more processors, cause the one or more processors to perform a method, the method comprising:
    detecting, using a detection system including one or more sensors, a rail agent in a vicinity of an autonomous vehicle, the rail agent being on a track having a geometry;
    determining a likelihood for each of one or more probable paths of the rail agent based on each of one or more motion plans of the one or more probable paths, wherein at least one of the one or more probable paths includes a path direction in which the rail agent will probably travel and at least one of the one or more motion plans;
    determining a path for the autonomous vehicle based on a most probable path for the rail agent; and
    operating the autonomous vehicle based, at least in part, upon the determined path.

17. The medium of claim 16, wherein the most probable path has a highest likelihood.

18. The medium of claim 16, wherein the at least one of the one or more motion plans includes a predicted acceleration and deceleration of the rail agent.

19. The medium of claim 16, wherein the determining of the likelihood for each of the one or more probable paths of the rail agent is further based on possible paths for the rail agent, and wherein the method further comprises filtering the possible paths based on characteristics of the rail agent or one or more traffic control factors, the filtered possible paths being the one or more probable paths.

20. The medium of claim 19, wherein the one or more traffic control factors include the geometry of the track along a possible path.

\* \* \* \* \*